J. HARTINGER.
COMBINED HARROW AND ROLLER.
No. 177,636. Patented May 23, 1876.
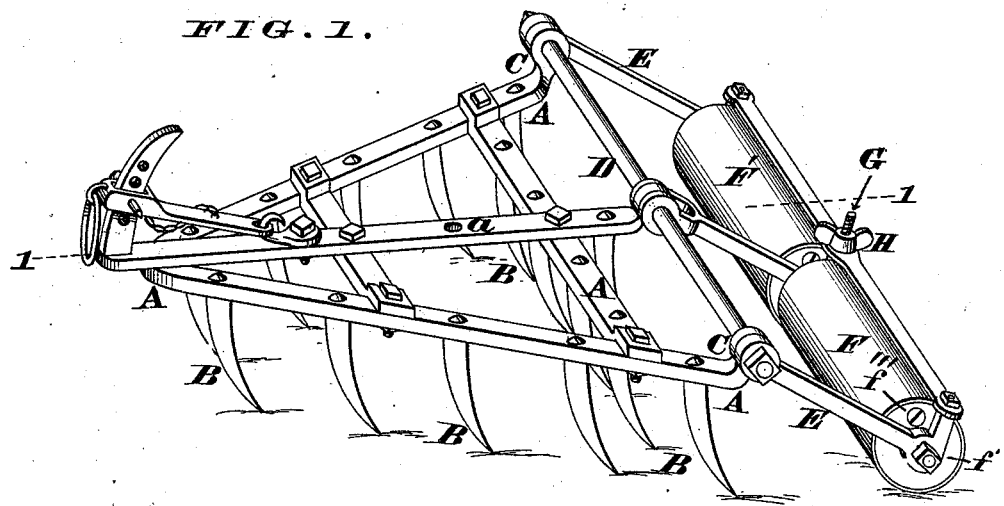
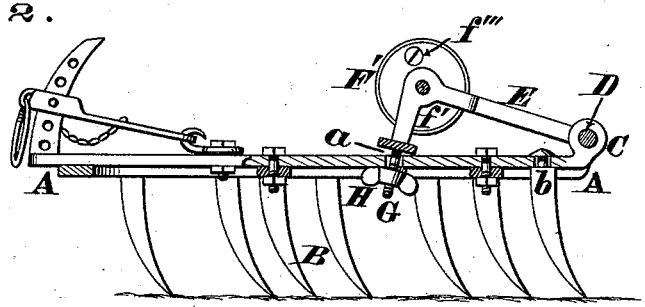
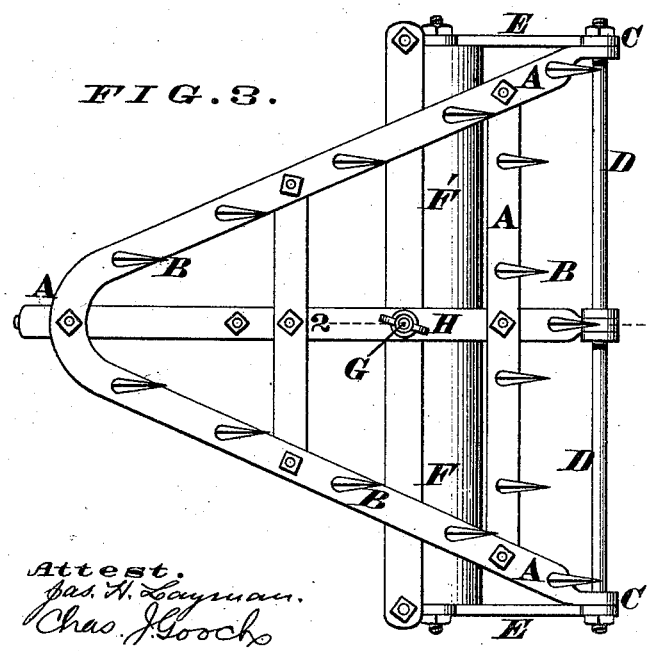
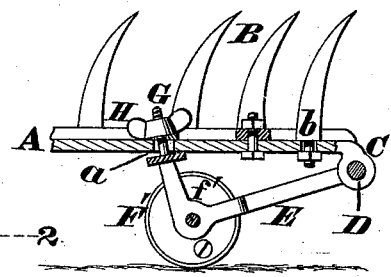
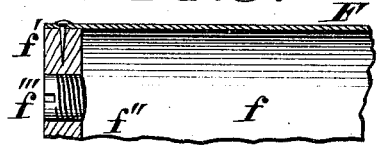
Attest.
Jas. H. Layman.
Chas. J. Gooch.
John Hartinger
By Knight Bros. Atty's.

UNITED STATES PATENT OFFICE.

JOHN HARTINGER, OF CINCINNATI, OHIO.

IMPROVEMENT IN COMBINED HARROWS AND ROLLERS.

Specification forming part of Letters Patent No. 177,636, dated May 23, 1876; application filed November 11, 1875.

*To all whom it may concern:*

Be it known that I, JOHN HARTINGER, of Cincinnati, Hamilton county, State of Ohio, have invented a new and useful Combined Harrow and Roller, of which the following is a specification:

My invention comprises an arrangement of harrow, to whose rear is hinged a pair of floating-rollers, whose frame is furnished with a thumb-screw. These members are capable of being arranged relatively to one another in various ways—for example, to operate as a combined roller and harrow, or as a harrow simply, the roller being folded over upon the harrow, and serving to weight the same, or as a roller, the harrow being folded over and serving to weight the roller; or the roller may, if desired, be unshipped, leaving the harrow free.

In the accompanying drawing, Figure 1 is a perspective view of my implement in its extended form. Fig. 2 is a section, at line 1 1, of my implement in its folded condition, and in position for harrowing. Fig. 3 is a top view of the folded implement in position for rolling. Fig. 4 is a section at the line 2 2. Fig. 5 is an enlarged longitudinal section of a portion of one of the rollers.

A is a triangular frame of iron. B are the harrow-teeth of cimeter form, and having each a round neck or shank, $b$, which occupies a corresponding orifice in the frame A, and is riveted above the same, so as to keep the tooth from separating from the frame, and yet to allow it to rotate about its neck as an axis, so as always, and automatically, to present its sharp convex edge to the ground. The frame A of the harrow terminates rearward in eyes C, which receive a rod, D, by which the floating frame E of the rollers F F' is hinged to the harrow-frame. Projecting from the roller-frame E is a screw-bolt, G, adapted in the folded condition of the implement to occupy an orifice, $a$, in the harrow-frame, and to be secured thereto by means of a thumb-nut, H.

By this means the weight of the rollers and roller-frame becomes available for the harrow, or that of the harrow for the rollers, according to which side of the implement is placed uppermost. (See Figs. 2, 3, and 4.)

The rollers are hollow iron cylinders $f$, closed by heads $f'$, which may be of wood or iron, and which are perforated for a plug, $f'''$, whose temporary removal enables the introduction of sand, or other heavy body or substance, when desired, to add to the weight of the roller.

Owing to the peculiar conformation and attachment of the teeth my harrow is adapted to go easily over rocks, roots, or other impediments without injury to the implement or gearing, or strain upon the team.

I claim as new and of my invention—

The combined harrow and roller, hinged one to the other in the manner described, to adapt them to fold compactly back to back, in combination with the screw and nut for rigidly securing them together, as specified.

In testimony of which invention I hereunto set may hand.

JOHN HARTINGER.

Attest:
GEO. H. KNIGHT,
JAMES H. LAYMAN.